(12) United States Patent
Watanabe

(10) Patent No.: US 7,560,897 B2
(45) Date of Patent: Jul. 14, 2009

(54) CURRENT CONTROLLER AND CURRENT OFFSET CORRECTION

(75) Inventor: Junichi Watanabe, Kitakyushu (JP)

(73) Assignee: Kabushiki Kaisha Yaskawa Denki, Kitakyushu-shi (JP)

( * ) Notice: Subject to any disclaimer, the term of this patent is extended or adjusted under 35 U.S.C. 154(b) by 131 days.

(21) Appl. No.: 11/908,463

(22) PCT Filed: Mar. 3, 2006

(86) PCT No.: PCT/JP2006/304113

§ 371 (c)(1),
(2), (4) Date: Sep. 12, 2007

(87) PCT Pub. No.: WO2006/103869

PCT Pub. Date: Oct. 5, 2006

(65) Prior Publication Data

US 2009/0052215 A1    Feb. 26, 2009

(30) Foreign Application Priority Data

Mar. 29, 2005  (JP)  ............................. 2005-095509

(51) Int. Cl.
*H02P 23/00* (2006.01)
(52) U.S. Cl. ........................ 318/811; 318/809
(58) Field of Classification Search .............. 318/809, 318/811

See application file for complete search history.

(56) References Cited

U.S. PATENT DOCUMENTS 4,346,434 A * 8/1982 Morinaga .................... 318/809

FOREIGN PATENT DOCUMENTS

| JP | 2003-164159 A | 6/2003 |
| JP | 2003-164192 A | 6/2003 |
| JP | 2004-336876 A | 11/2004 |
| JP | 2005-45990 A | 2/2005 |

* cited by examiner

*Primary Examiner*—Shawn Riley
(74) *Attorney, Agent, or Firm*—Sughrue Mion, PLLC

(57) ABSTRACT

To provide a current controller capable of constantly detecting an offset value of a current detection system, the offset value overlapping with a current detection value, in a state of regular operation of a motor to correct the current detection value and capable of current detection with high accuracy and a current offset correction method of the same.

A carrier wave peak-trough judging part 10 is provided to discriminating the peak and the trough of a carrier wave. An A/D converted value detected in falling from the peak of the carrier wave is used as a current detection value. An A/D converted value detected in rising from the trough of the carrier wave is used as an offset value in the case that a modulated wave command is larger than a comparison standard value capable of computation by means of a calculation formula. On the basis of the current detection value and the offset value, carried out is an operation of a current detection correction value.

9 Claims, 7 Drawing Sheets

CURRENT CONTROLLER AND CURRENT OFFSET CORRECTION

TECHNICAL FIELD

The present invention relates to a current controller for controlling an electric current for driving a motor and a current offset correction method for suppressing an offset of a current detection value and temperature drift of a three-phase PWM inverter.

BACKGROUND ART

A conventional current controller includes a current detecting device for detecting current values of respective phases of a three-phase inverter on the basis of voltage decreases of shunt resistors connected in series to lower arm elements of the respective phases and controls an electric current for driving a motor. Among such current detecting devices, provided has been a current detecting device comprising a current value determining part, which employs a reverse signal value of the sum of current values of two phases as a current of the other phase of one lower arm element having a short on-period among the lower arm elements, wherein all phase currents are detected with high accuracy during a current phase period in which one lower arm element incapable of detecting a shunt resistor due to its arrangement on the lower arm side is only off and a current phase period in which a short on-period of the lower arm element causes difficulty in detection with high accuracy although the lower arm element is on. (Refer to Patent Reference 1, for example.)

Further, as a current offset correction method of a current controller, provided has been the following one. In the current offset correction method, when a state of 50% duty ratios of all PWM signals PWMU, PWMV and PWMW denoting that phase currents iu, iv and iw are 0 continues for a predetermined time sufficient to lose electromagnetic energy accumulated in a motor, the phase currents iu, iv and iw are read and memorized as current offset quantities, which are used thereafter to conduct offset compensation for the detected phase currents iu, iv and iw, so as to achieve a simple and accurate detection of the phase currents iu, iv and iw. (Refer to Patent Reference 2, for example.)

Patent Reference 1:
JP-A-2003-164159 (Pages 3 and 4 and FIG. 5)
Patent Reference 2:
JP-A-2003-164192 (Pages 4 and 5 and FIGS. 5 and 6)

Related art will be described hereinafter, using the drawings. FIG. 4 illustrates a general structure of a current controller having a current detecting device such as one disclosed in Patent Reference 1. In FIG. 4, 1 denotes a current controller, 2 denotes a three-phase PWM inverter part, 3 denotes a switching element driving circuit, 4 denotes an A/D converter part, 5 denotes a current control operating part, 6 denotes a modulated wave command creating part, 7 denotes a current detection value operating part, 8 denotes a carrier wave generating part and 9 denotes a PWM signal generating part. Further, 101 denotes a commercial power source, 102 denotes a converter part, 103 denotes a smoothing capacitor, 104 denotes a motor, 105 denotes a position detector and 106 denotes an upper controlling part. Adding the current controller 1 to the above forms a general structure of a motor controlling device. Moreover, 21 denotes a switching element and 22 denotes a freewheel diode. 23 denotes a shunt resistor inserted between a switch S2 on a negative side (Nch) and a negative side (Nch) of a DC bus for detecting an electric current. 24 denotes a charge pump circuit for using a negative side pulse of the switching element 21 to make a driving power supply for the switching element 21.

The freewheel diode 22 connected in parallel reversely to an IGBT transistor 21 is used for forming a switch S1. Two of S1 and S2 connected in series form a pair for one phase. Three pairs of the above are used for three phases. The charge pump circuit 21 is connected from a DC power source +Vs to the switching element driving circuit 3 through diodes and a capacitor, which are connected respectively in a forward direction with respect to the respective phases. The switching element 21, the freewheel diode 22, the shunt resistor 23 and the charge pump circuit 24 form the three-phase PWM inverter part 2.

First of all, described will be an operation of a general motor controlling device. The upper controlling part 106 performs position control, speed control and torque control in accordance with a position feedback signal, which is a position detection signal in the position detector 105, and a command for operation from the outside to output a current command to the current control operating part 5. The converter part 102 converts AC power of the commercial power source 101 into DC power. The three-phase PWM inverter part 2 converts DC power into AC power in accordance with a PWM signal from the PWM signal generating part 9 to supply the motor 104 with power. In such a series of operation, the motor controlling device controls the motor in accordance with a command for operation from the outside.

Now, described will be operations of the respective parts of the current controller 1. The A/D converter part 4 detects voltages at the both ends of the shunt resistor 23 in the three-phase PWM inverter part 2 to detect an electric current flowing in the shunt resistor 23. The A/D converter part 4 A/D converts the detected voltages at the both ends as current feedback signals to output the signals to the current detection value operating part 7. The current detection value operating part 7 carries out a current detection value operation of the current feedback signals from the A/D converter part 4 to output the current detection value to the current control operating part 5. Further, the current detection value operating part also performs both of offset value detection and an offset correcting operation, which are based on a current detection value, in the case of carrying out an offset correction of the current detection value.

The current control operating part 5 performs a current control operation on the basis of a current command from the upper controlling part 106, a current detection value from the current detection value operating part 7 and a position feed back signal to output a voltage command to the modulated wave command creating part 6. The carrier wave generating part 8 outputs a carrier wave in accordance with carrier wave frequency and carrier wave amplitude. The modulated wave command creating part 6 limits a modulation ratio in the case that the voltage command is larger than the carrier wave amplitude. The modulated wave command creating part 6 then creates a modulated wave command so as to output voltage according to the voltage command to output the modulated wave command to the PWM signal generating part 9. The PWM signal generating part 9 compares the carrier wave and the modulated wave command to generate a pulse signal, and further, generate an inversion signal of the pulse signal. After the above, the PWM signal generating part generates PWM signals for two of positive and negative sides of the switching element.

The PWM signals have dead time so that the switching elements on the positive and negative sides of the same phase would not turn on simultaneously since a DC power source is short-circuited in the case of the switching elements simultaneously turning on. Moreover, generally in accordance with the voltage command or the modulation ratio command, compensation of voltage varying according to the dead time is carried out on the basis of a current command, a current detection value, a current estimation value and the like. This allows the voltage command to be accorded with the actual voltage. The switching element driving circuit 3 controls ON/OFF of the switching element 21 in accordance with the PWM signal to supply the motor 104 with power.

Now, described will be an offset correcting operation in the related art. FIG. 5 is a flowchart showing a current offset quantity detecting operation in the related art. First, duty ratios of PWM signals of the respective phases are read (S100). The duty ratios of PWM signals, which have been read, are judged whether or not all of the duty ratios are 50% (S102). In the case that all the duty ratios are judged to be 50%, it is judged whether a state that all the duty ratios are 50% continues for a predetermined time or not (S104). When it is judged that the state continues for the predetermined time, operations of current offset quantities of the respective phases are executed (S106, S108 and S110). In the above context, the duty ratios of the PWM signals of the respective phases are assumed to be values ignoring the dead time.

FIG. 6 is a flowchart showing an operation of carrying out a current offset quantity operation in the related art. First, the phase currents iu, iv and iw of the three phases are read during the period that a lower arm element at the subsequent time is on, and then, the read phase currents iu, iv and iw are set as the present time values of the offset quantities of the respective phases (S200). Second, the sum of the present time values of the respective offset quantities, which are respectively obtained during the period that a lower arm element at the N-th (wherein N denotes an integral value) time preceding to the present time is on, is calculated (S202 and S204). The sum is divided by N to calculate an average offset value for every phase (S206) and memorize the calculated value (S208).

FIG. 7 is a flowchart showing a current offset correction operation using the current offset quantity in the related art. First, the phase currents iu, iv and iw of the three phases are read with predetermined timing (S300). Memorized values of the current offset quantities are then subtracted from the read phase currents iu, iv and iw of the three phases, individually, to obtain offset compensation phase currents iu', iv' and iw' (S302). The obtained offset compensation currents iu', iv' and iw' are outputted as the new current detection values (S304).

As described above, in the conventional device and the current offset correction method of the same, carried out current offset quantity detection, current offset quantity operation and current offset quantity correction in the current detection value operating part 7 to perform current control on the basis of the new current detection value obtained by correcting variation of the offset quantity of the current detection system.

DISCLOSURE OF THE INVENTION

Problems to be Solved by the Invention

In the conventional current controller in Patent Reference 1, the currents on the lower arm side of all of the three phases are detected for correction with accuracy. This causes a problem that the current detection with high accuracy is impossible in current detection on the lower arm side of only two phases, which is required due to a lower cost, miniaturization and a simplified circuit.

Further, in the conventional current offset correction method in Patent Reference 2, the phase currents are read to be used as the current offset quantities for carrying out offset correction in the case that all the duty ratios of the PWM signals of the respective phases are 50%, which denotes that the respective phase currents are 0, and that such a state continues for a predetermined time. This causes a problem that the offset correction is impossible under a condition of practical use since a state of 50% of all the duty ratios of the PWM signals of the respective phases in turning on a motor in practice for the purpose of a servo is only a state of servo-lock with no load.

In view of the above, an object of the invention is to provide a current controller capable of constantly detecting and correcting an offset value in a state of turning on the motor, effective not only for a regular offset but for an offset varying in accordance with time, and capable of current detection with high accuracy even in the current detection on the lower arm side of only two phases required due to lower cost, miniaturization and simplification of a circuit and a current offset correction method of the same.

Means for Solving the Problems

In order to solve the above problems, the invention is as follows.

According to Claim 1, there is provided a current controller including:

a current control operating part for performing a current control operation on the basis of a current command to create a voltage command, a modulated wave command creating part for creating a modulated wave command on the basis of the voltage command, a carrier wave generating part for generating a carrier wave, a PWM signal generating part for generating a PWM signal on the basis of comparison between the modulated wave command and the carrier wave, an A/D converter part for A/D converting a current detection value of each phase on the basis of a voltage decrease of a shunt resistor connected in series to a lower arm element of each phase of a three-phase PWM inverter, a carrier wave peak-trough judging part for receiving an input of the carrier wave to output a judging signal of a rise or a fall of the carrier wave, and a current detection value operating part for receiving inputs of the modulated wave command and information of the peak-trough and an A/D converted value to output a current detection correction value.

According to Claim 2, there is provided the current controller according to Claim 1, wherein the judging signal judges whether the carrier wave is in rising from the trough or in falling from the peak on the basis of:

a flag signal indicating whether or not a sampling value of the carrier wave for the present time has exceeded a maximum amplitude value or the minimum amplitude value of the carrier wave; and a sampling value of the carrier wave in an optional section preceding to the sampling value of the carrier wave for the present time.

According to Claim 3, there is provided the current controller according to Claim 1, wherein the current detection value operating part carries out an operation of a current detection correction value by subtraction of a current detection value and an offset value, the current detection value being an A/D converted value detected in falling from the peak of the carrier wave, the offset value being an A/D converted value detected in rising from the trough of the carrier wave.

According to Claim 4, there is provided the current controller according to Claim 1, wherein the current detection value operating part carries out offset detection of the current detection value and an offset correction operation on the basis of comparison between the modulated wave command and a comparison standard value.

According to Claim 5, there is provided the current controller according to Claim 1, wherein the current detection value operating part carries out offset detection only when the carrier wave is in rising from the trough thereof and the modulated wave command is larger than the comparison standard value.

According to Claim 6, there is provided the current controller according to Claim 1, wherein the comparison standard value used in the current detection value operating part is calculated on the basis of sampling and holding time of the A/D converter part, a frequency of a carrier wave and dead time.

According to Claim 7, there is provided the current controller according to Claim 1, wherein the A/D converted value is the current detection value of three or any two phases of the three-phase inverter.

According to Claim 8, there is provided a current offset correction method of a current controller including:

a current control operating part for performing a current control operation on the basis of a current command to create a voltage command, a modulated wave command creating part for creating a modulated wave command on the basis of the voltage command, a carrier wave generating part for generating a carrier wave, a PWM signal generating part for generating a PWM signal on the basis of comparison between the modulated wave command and the carrier wave, and an A/D converter part for A/D converting a current detection value of each phase on the basis of a voltage decrease of a shunt resistor connected in series to a lower arm element of each phase of a three-phase PWM inverter, the current offset correction method including:

a peak-trough judging process for judging whether the carrier wave is in rising from the trough thereof or in falling from the peak thereof;

a comparing process for comparing the modulated wave command and a comparison standard value on the basis of a result in the judging process;

an offset detecting process for detecting an offset of the current detection value on the basis of a result in the comparing process; and a correction value operating process for obtaining a difference between the current detection value and an offset value detected in the offset detecting process as a current detection correction value, wherein a series of the processes are constantly carried out in a state of regular operation of a motor.

According to Claim 9, there is provided the current offset correction method of the current controller according to Claim 8, wherein the peak-trough judging process is carried out after completing a process of A/D converting the current detection value, and in the peak-trough judging process, an A/D converted value is used as the current detection value when the carrier wave is in falling from the peak thereof, while the process goes to the comparing process when the carrier wave is in rising from the trough thereof, and in the comparing process, the A/D converted value is used as the offset value when the modulated wave command is larger than the comparison standard value, while the process goes to the correction value operating process when the modulated value command is smaller than the comparison standard value.

EFFECTS OF THE INVENTION

In accordance with the invention according to Claim 1, an offset value of the current detection system, which overlaps with the current detection value, can be detected and the current detection value can be corrected. This allows current controlling performance in the current detection with high accuracy to be improved.

In accordance with the invention according to Claim 2, it is easily and certainly judged whether the carrier wave is in rising from the trough thereof or in falling from the peak thereof.

In accordance with the invention according to Claim 3, an offset value can be constantly detected to correct the current detection value in a state of turning on a motor. Accordingly, an offset value can be detected to correct the current detection value not only for a regular offset but also for an offset varying in accordance with time such as temperature drift.

In accordance with the invention according to Claim 4 or the invention according to Claim 5, error detection in offset detection can be prevented, so that the current controlling performance can be prevented from deteriorating.

In accordance with the invention according to Claim 6, a simple operation formula calculates a comparison standard value to be calculated in a state of turning on a motor or in advance of turning on of a motor. This allows a load of software processing time to be reduced.

In accordance with the invention according to Claim 7, an offset value can be detected to correct the current detection value even in the current detection on the lower arm side of any two phases of a three-phase inverter, which is required due to lower cost and miniaturization of a device and simplification of a circuit.

In accordance with the invention according to Claim 8, an offset value of the current detection system, which overlaps with the current detection value, can be detected and the current detection value can be corrected. This allows the current controlling performance in the current detection with high accuracy to be improved.

In accordance with the invention according to Claim 9, an offset value can be constantly detected to correct the current detection value in a state of turning on a motor. Accordingly, the offset value can be detected to correct the current detection value not only for a regular offset but also for an offset varying in accordance with time such as temperature drift.

Figure 1:
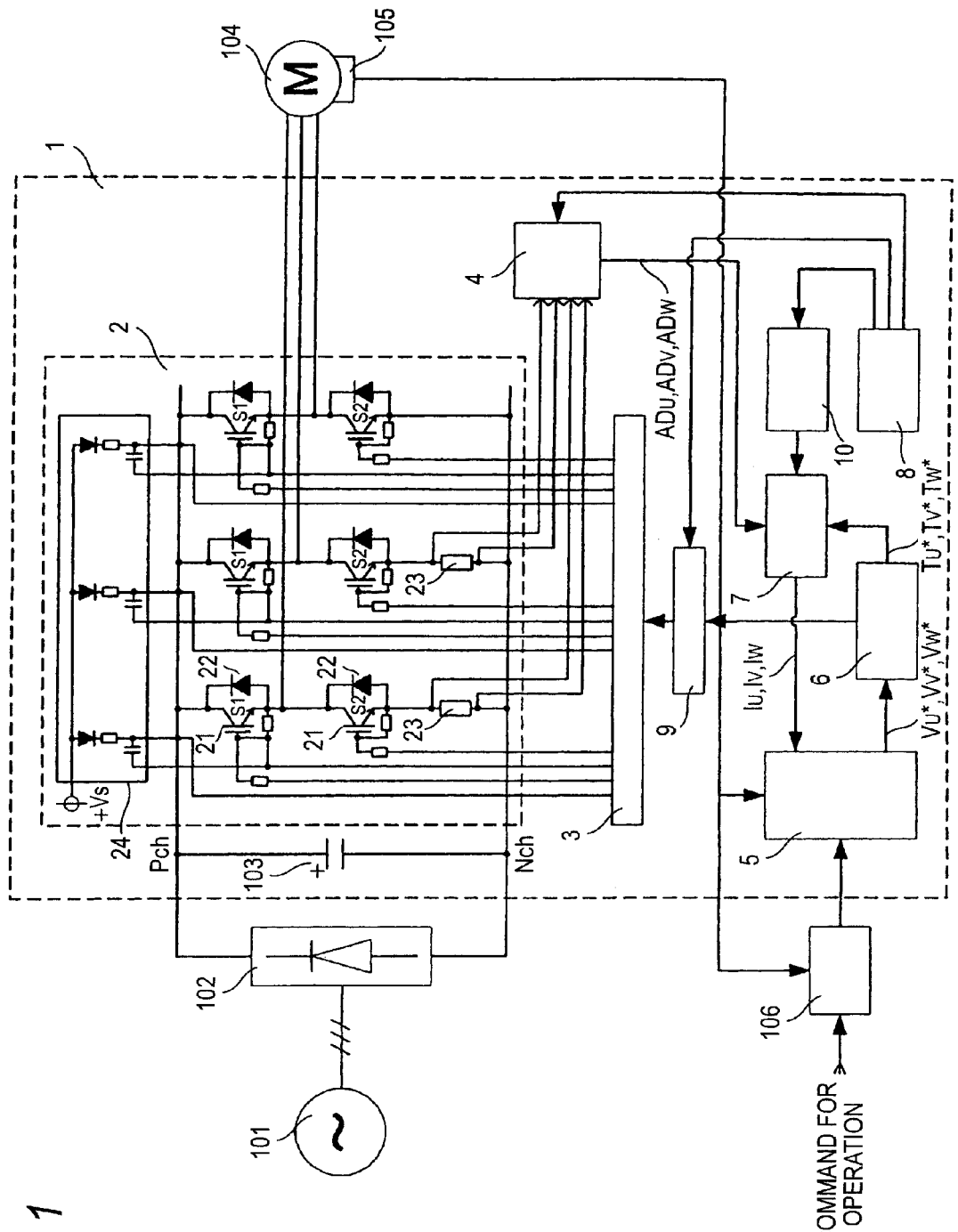
FIG. 1 illustrates a structure of a current controller in accordance with Embodiment 1 of the invention.

1 current controller
2 three-phase PWM inverter part
3 switching element driving circuit
4 A/D converter part
5 current control operating part
6 modulated wave command creating part
7 current detection value operating part
8 carrier wave generating part
9 PWM signal generating part
10 carrier wave peak-trough judging part
21 switching element
22 freewheel diode
23 shunt resistor
24 charge pump circuit
101 commercial power source
102 converter part
103 smoothing capacitor
104 motor
105 position detector
106 upper controlling part

BEST MODE FOR CARRYING OUT THE INVENTION

Now, described will be concrete embodiments of the current controller and the current offset method of the same in accordance with the invention, on the basis of the drawings.

EMBODIMENT 1

FIG. 1 illustrates a structure of the invention. In FIG. 1, 1 denotes a current controller, 2 denotes a three-phase PWM inverter part, 3 denotes a switching element driving circuit, 4 denotes an A/D converter part, 5 denotes a current control operating part, 6 denotes a modulated wave command creating part, 7 denotes a current detection value operating part, 8 denotes a carrier wave generating part, 9 denotes a PWM signal generating part and 10 denotes a carrier wave peak-trough judging part. Further, 21 denotes a switching element. 22 denotes a freewheel diode. 23 denotes a shunt resistor inserted between a switch S2 on a negative side (Nch) and a negative side (Nch) of a DC bus for detecting an electric current. 24 denotes a charge pump circuit for using a negative side pulse of the switching element 21 to make a driving power supply for the switching element 21.

The freewheel diode 22 connected in parallel reversely to an IGBT transistor 21 is used for forming a switch S1. Two of S1 and S2 connected in series form a pair for one phase. Three pairs of the above are used for three phases. The charge pump circuit 21 is connected from a DC power source +Vs to the switching element driving circuit 3 through diodes and a capacitor, which are connected respectively in a forward direction with respect to the respective phases. The switching element 21, the freewheel diode 22, the shunt resistor 23 and the charge pump circuit 24 form the three-phase PWM inverter part 2.

The invention is different from Patent References 1 and 2 in that the carrier wave peak-trough judging part 10 is provided and in that the current detection value operating part 7 carries out a current offset value detection method and a current offset value correction method, which are based on outputs from the carrier wave peak-trough judging part 10 and the modulated wave command creating part 6.

Now, described will be an operation of a motor controlling device having the current controller in accordance with the invention. The upper controlling part 106 performs position control, speed control and torque control in accordance with a position feedback signal, which is a position detection signal in the position detector 105, and a command for operation from the outside to output a current command to the current control operating part 5. The converter part 102 converts AC power of the commercial power source 101 into DC power. The three-phase PWM inverter part 2 converts DC power into AC power in accordance with a PWM signal from the PWM signal generating part 9 to supply the motor 104 with power. In such a series of operation, the motor controlling device controls the motor in accordance with a command for operation from the outside.

Next, an operation of the current controller will be described. The upper controlling part 106 performs position control, speed control and torque control in accordance with a position feedback signal, which is a position detection signal in the position detector 105, and a command for operation from the outside to output a current command to the current control operating part 5. The converter part 102 converts AC power of the commercial power source 101 into DC power. The three-phase PWM inverter part 2 converts DC power into AC power in accordance with a PWM signal from the PWM signal generating part 9 to supply the motor 104 with power. In such a series of operation, the motor controlling device controls the motor in accordance with a command for operation from the outside.

Now, described will be operations of the respective parts of the current controller 1. The A/D converter part 4 detects voltages at the both ends of the shunt resistor 23 in the three-phase PWM inverter part 2 to detect an electric current flowing in the shunt resistor 23. The A/D converter part 4 A/D converts the detected voltages at the both ends as current feedback signals to output the signals to the current detection value operating part 7 as digital values $AD_U$, $AD_V$ and $AD_W$. The carrier wave peak-trough judging part 10 discriminates between the peak and the trough to output information on the discrimination to the current detection value operating part 7. The current detection value operating part 7 detects a current offset value of the detection current and performs current offset correction on the basis of modulated wave commands $T_U^*$, $T_V^*$ and $T_W^*$, the information on the discrimination between the peak and the trough of the carrier wave and the current detection digital values $AD_U$, $AD_V$ and $AD_W$. The current detection value operating part 7 then outputs current detection values $I_U$, $I_V$ and $I_W$ to the current control operating part 5 after the offset correction.

The current control operating part 5 performs a current control operation on the basis of a current command from the upper controlling part 106, a current detection value from the current detection value operating part 7 and a position feedback signal to output voltage commands $V_U^*$, $V_V^*$ and $V_W^*$ to the modulated wave command creating part 6. The carrier wave generating part 8 outputs a carrier wave in accordance with carrier wave frequency and carrier wave amplitude. The modulated wave command creating part 6 limits a modulation ratio in the case that the voltage command is larger than the carrier wave amplitude. The modulated wave command creating part 6 then creates modulated wave commands $T_U^*$, $T_V^*$ and $T_W^*$ so as to output voltage according to the voltage commands to output the modulated wave commands to the PWM signal generating part 9. The PWM signal generating part 9 compares the carrier wave and the modulated wave commands to generate a pulse signal, and further, generate an inversion signal of the pulse signal. After the above, the PWM signal generating part 9 generates PWM signals for two of positive and negative sides of the switching element.

The PWM signals have dead time so that the switching elements on the positive and negative sides of the same phase would not turn on simultaneously since a DC power source is short-circuited in the case of the switching elements simultaneously turning on. Moreover, generally in accordance with the voltage command or the modulation ratio command, compensation of voltage varying according to the dead time is carried out on the basis of a current command, a current detection value, a current estimation value and the like. This allows the voltage command to be accorded with the actual voltage. The switching element driving circuit 3 controls ON/OFF of the switching element 21 in accordance with the PWM signal to supply the motor 104 with power.

Figure 2:
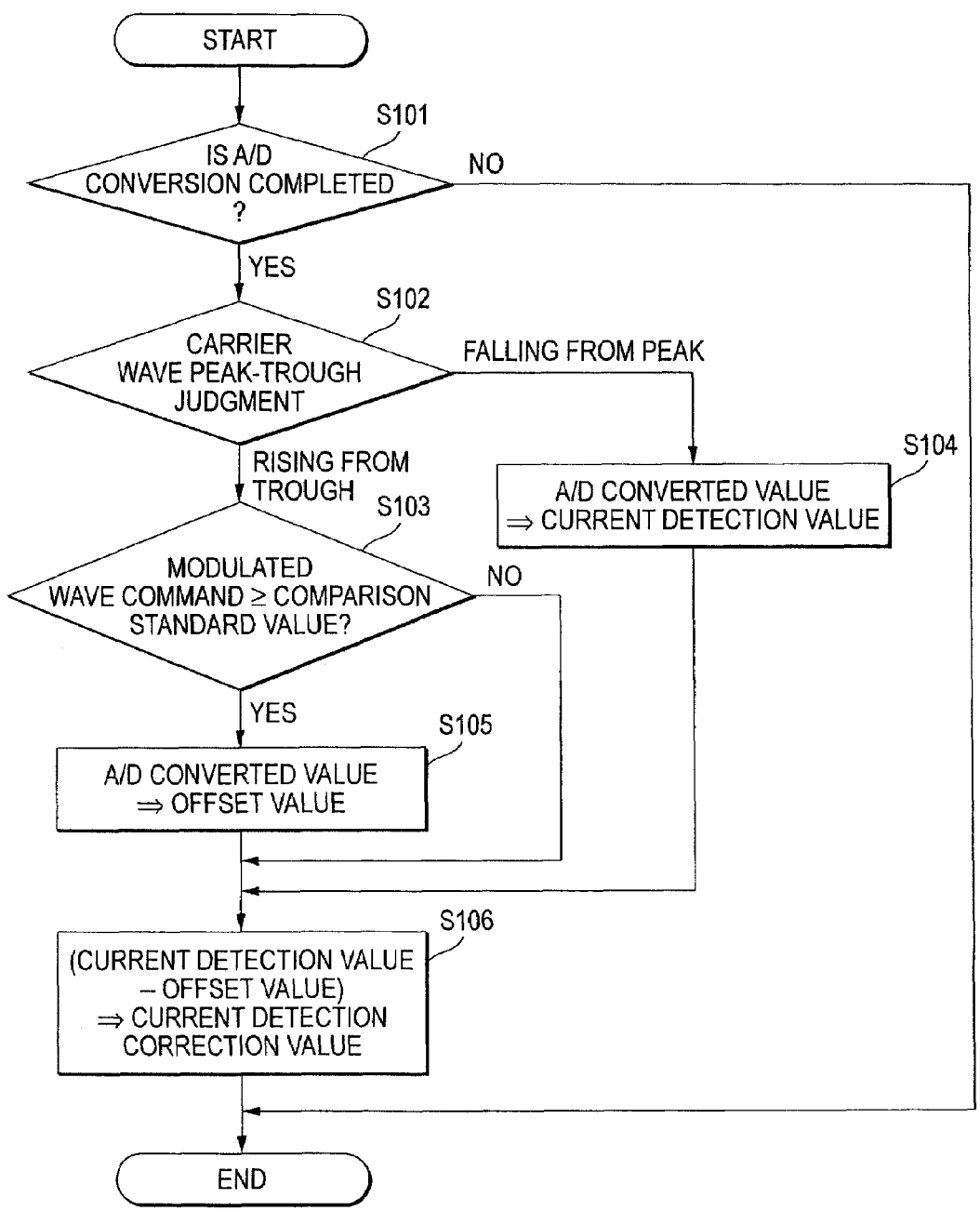
FIG. 2 is a flowchart showing a current offset correction method of a current controller in accordance with the invention.

Now, described will be a current offset correction method of a current controller. FIG. 2 is a flowchart showing a current offset correction method of a current controller.

(S101) First, confirmed is whether A/D conversion of the current detection values obtained by reading the detection voltages at the both ends of the shunt resistor 23 has been completed or not. In the case of completion, the process goes to (S102). A series of processes for correction is ended when the confirmation has not been completed.

(S102) It is judged whether the carrier wave from the carrier wave generating part 11 is in falling from the peak thereof or in rising from the trough thereof. The process goes to (S103) when the carrier wave is in rising from the trough. The process goes to (S104) when the carrier wave is in falling from the peak. As for the peak and trough of the carrier wave, whether the carrier wave is in rising from the trough or in falling from the peak can be judged in accordance with a flag signal, which shows whether a sampling value of the carrier wave for the present time has exceeded the maximum value of amplitude of the carrier wave or the minimum value of amplitude of the carrier wave, and a sampling value of a carrier wave in any section preceding to the sampling value of the carrier wave for the present time.

(S103) A modulated wave command from the modulated wave command creating part 6 is compared with a comparison standard value calculated by a later-mentioned calculation method. The process goes to (S106) in the case that the modulated wave command is smaller than the comparison standard value. The process goes to (S105) when the modulated wave command is equal to or larger than the comparison standard value.

(S104) When the carrier wave is in falling from the peak, turned on are the lower arms of the switching elements 21 of the respective phases and the current flows to the shunt resistor connected to the lower arm side of the respective phases. Accordingly, the A/D converted value obtained in the process of (S101) is set as a current detection value obtained before the offset correction for the present time, and then, the process goes to (S106).

(S105) When the carrier wave is in rising from the trough and the modulated wave command is equal to or more than the comparison standard value, turned on are the upper arms of the switching elements 21 of the respective phases and no current flows to the shunt resistor connected to the lower arm side of the respective phases. Accordingly, the A/D converted value obtained in the process of (S101) is set as an offset value for the present time, and then, the process goes to (S106).

(S106) The offset value is subtracted from the current detection value obtained before the offset correction to calculate a current detection value after the offset correction. In the case of carrying out the process of (S106) through the process of (S104), the offset value for the preceding time is subtracted from the current detection value for the present time, which obtained before the offset correction, to obtain the current detection value after the offset correction. In the case of carrying out the process of (S106) through the process of (S105), the offset value for the present time is subtracted from the current detection value for the preceding time, which is obtained before the offset correction, to obtain the current detection value after the offset correction.

Figure 3:
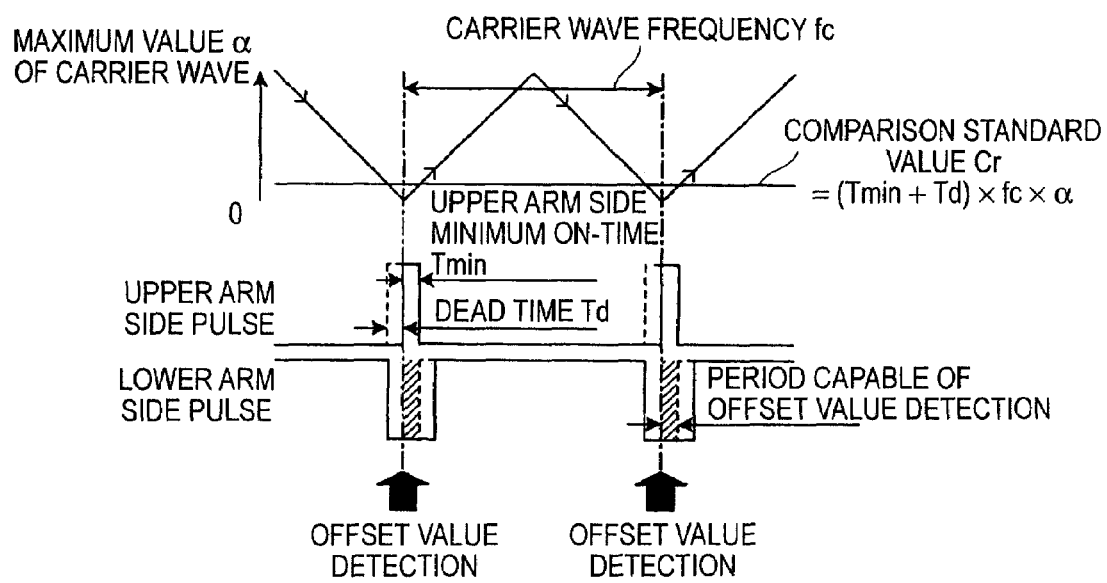
FIG. 3 illustrates a method of detecting a current offset value.
Figure 4:
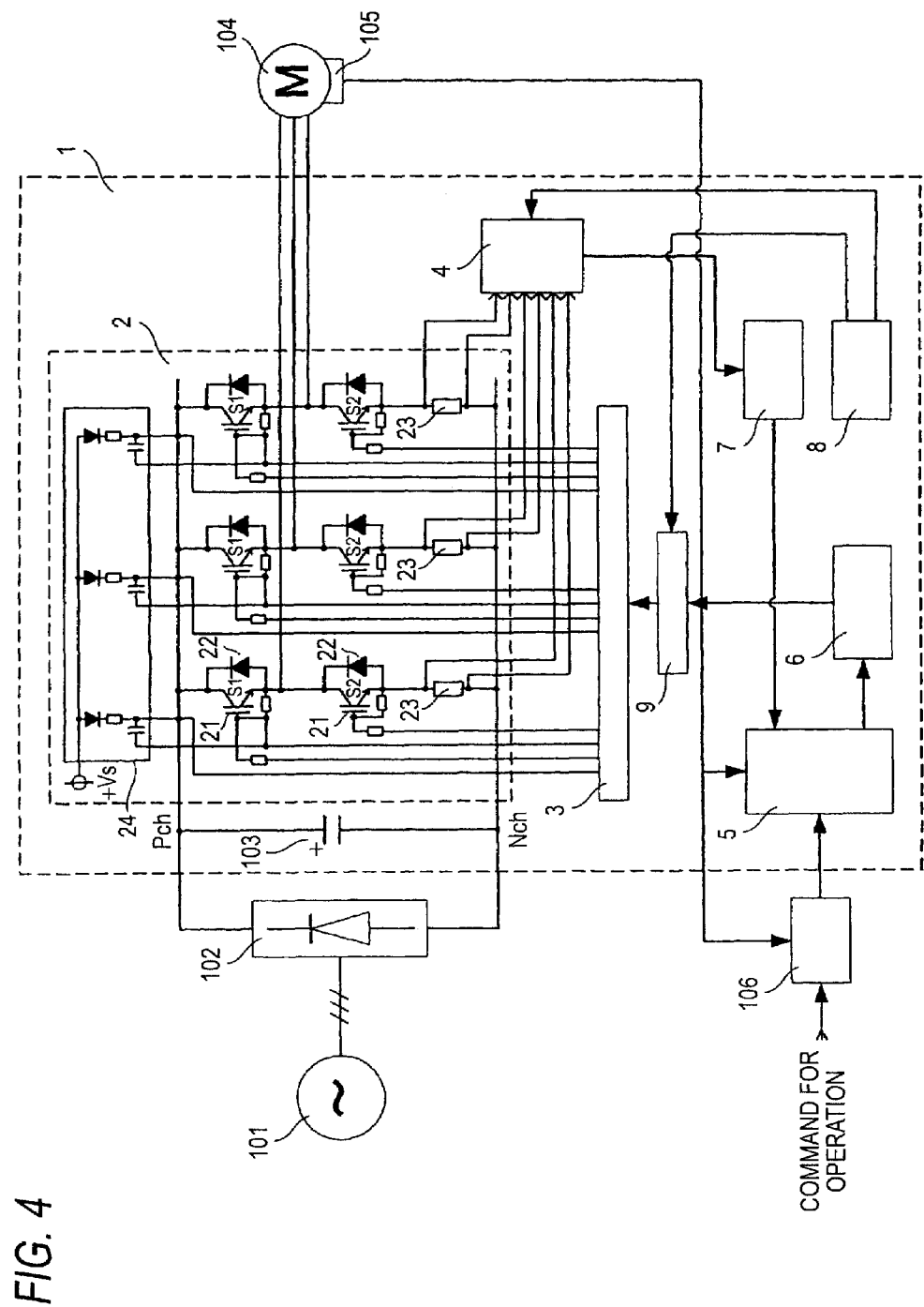
FIG. 4 illustrates a structure of a conventional current controller.
Figure 5:
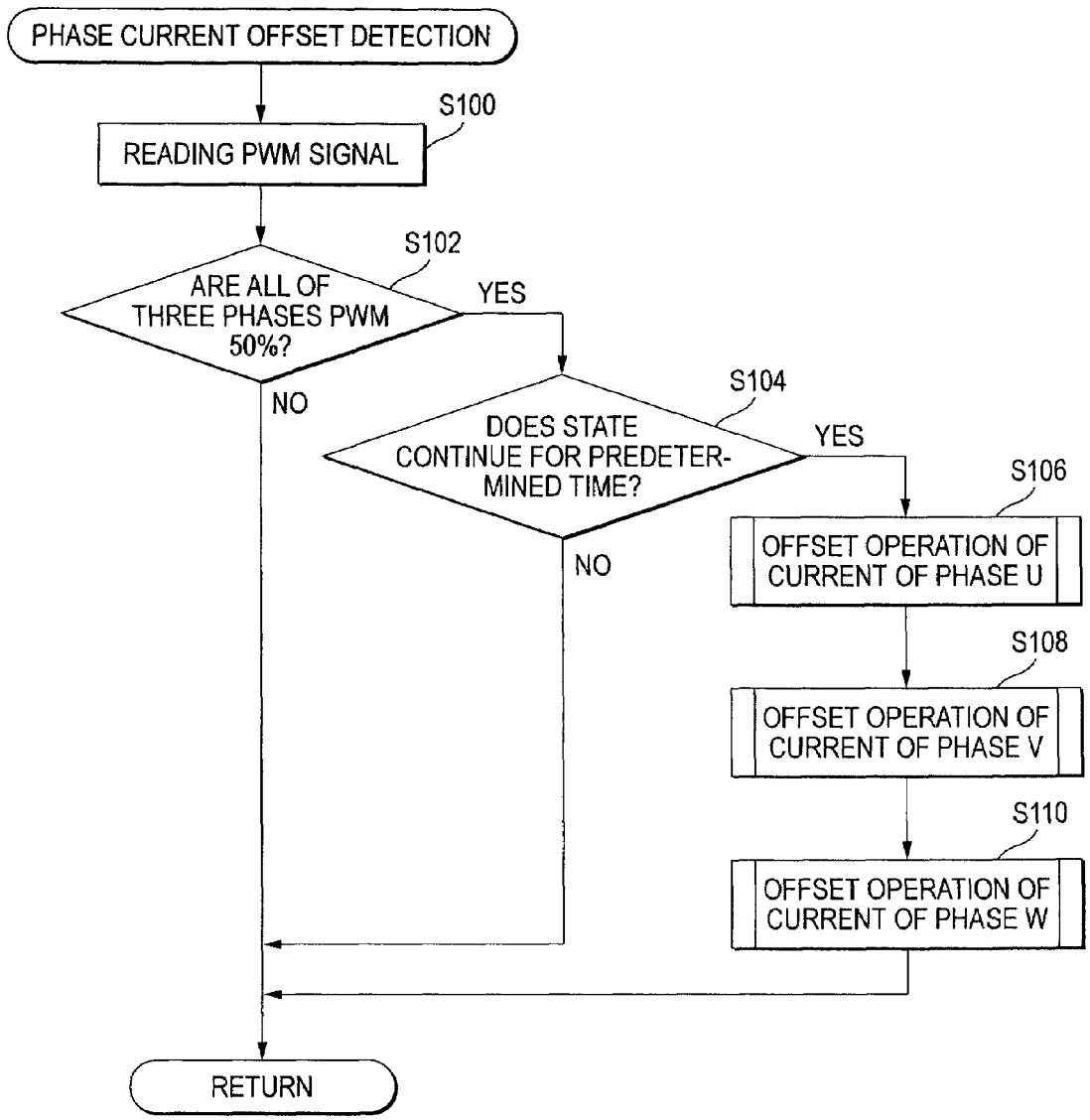
FIG. 5 is a flowchart showing a current offset quantity detecting operation in related art.
Figure 6:
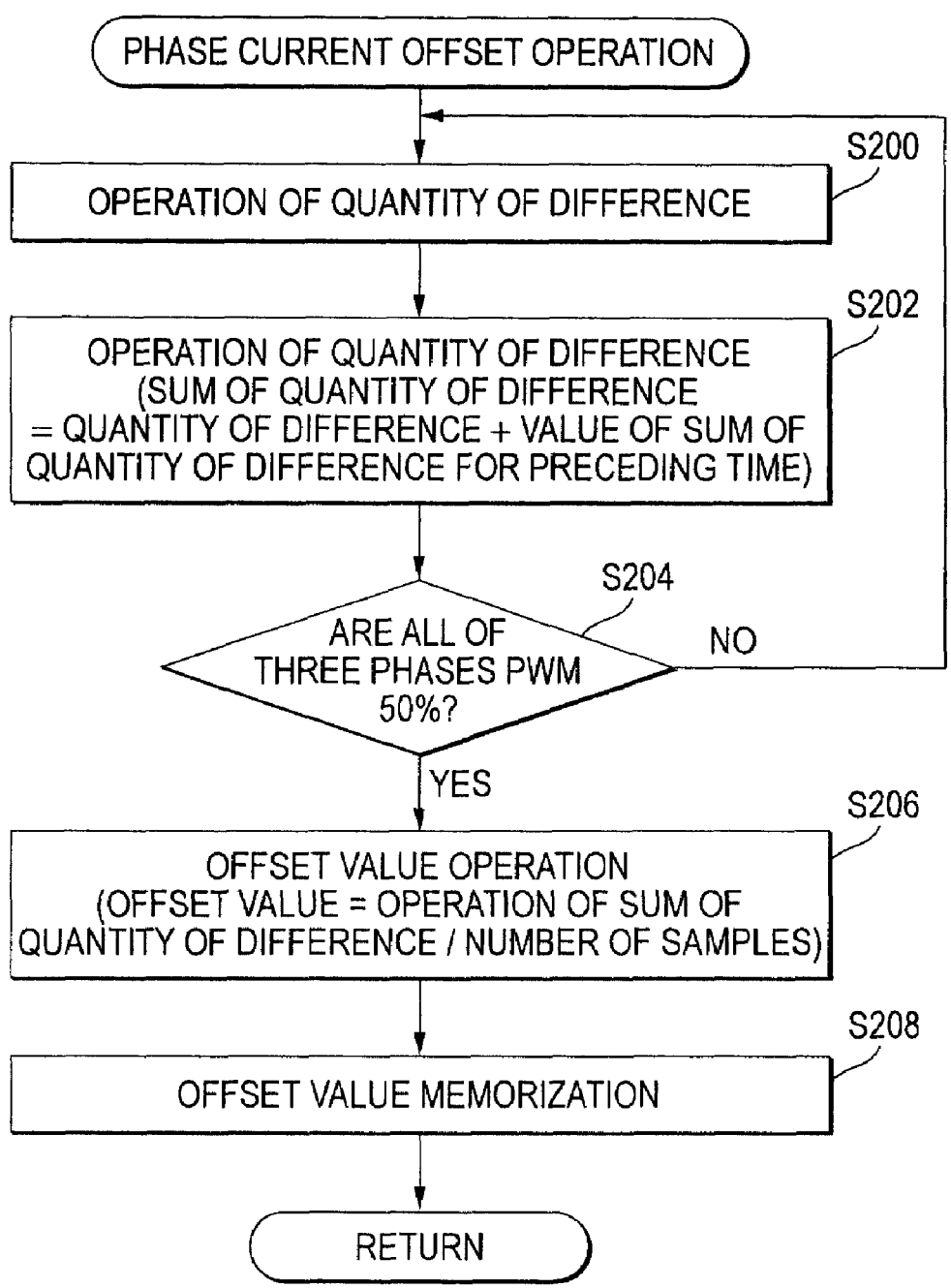
FIG. 6 is a flowchart showing an operation of carrying out a current offset quantity operation in related art.
Figure 7:
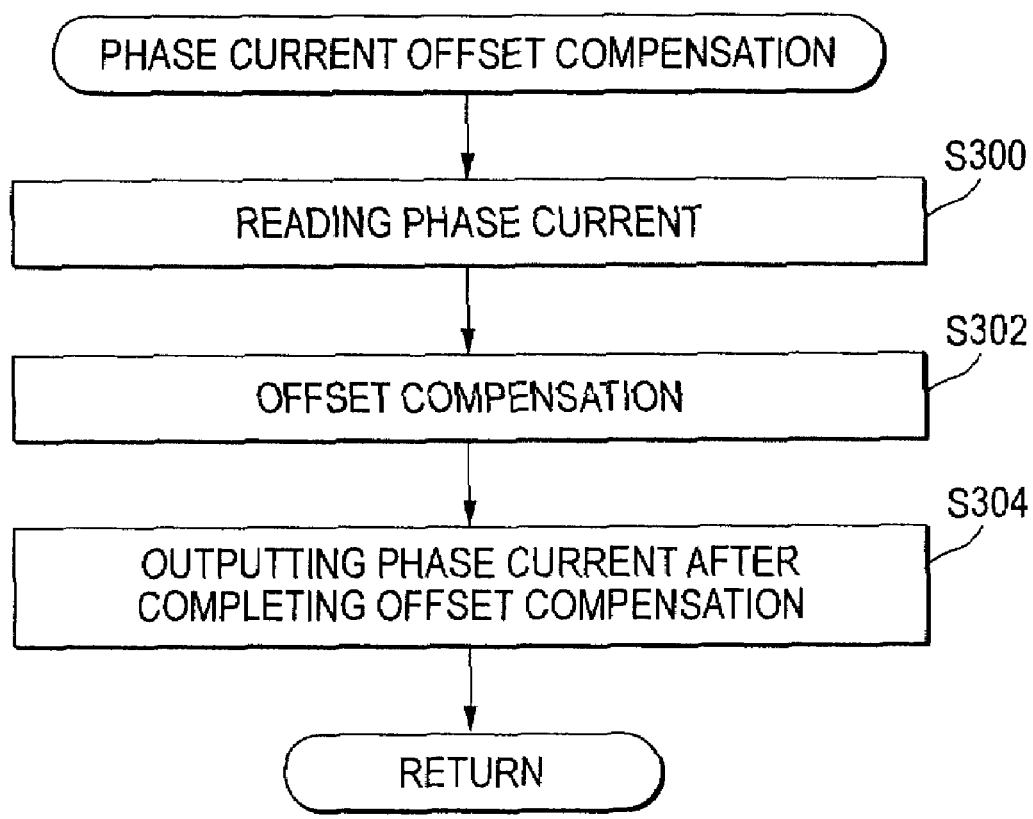
FIG. 7 is a flowchart showing a current offset correction operation using a current offset quantity in related art.

Now, described will be a method of detecting a current offset value. FIG. 3 illustrates a method of detecting a current offset value. In order to detect offset values of the respective phases in a state that the motor is turned on, required is to read the A/D converted value during a period that no current based on the current command flows on the lower arm side of the switching elements 21 of the respective phases. That is to say, when the lower arm side of the switching elements 21 of the respective phases is in a state of "ON" based on the PWM signal from the PWM signal generating part 9, the A/D converted value at that time is a current detection value including an offset value of the current detection system and based on the current command. Accordingly, it is difficult to only detect an offset value.

Therefore, the offset values of the respective phases can be detected within a period of a state that the upper arm side of the switching elements 21 of the respective phases is on (a state that the lower arm side is off). In FIG. 3, the offset values of the respective phases can be detected during a period capable of detecting the offset values in which the on-off state of the switching elements 21 of the respective phases are switched from the on-state of the lower arms to the on-state of the upper arm after the dead time Td has passed (a part shown by slant lines in FIG. 3).

The on-period of the upper arm, which is the period capable of detecting the offset values, can be judged to be the on-period of the upper arm, that is, the period capable of detecting the offset values in the case that the modulated wave command is equal to or more than the comparison standard value in comparison between the modulated wave command and the comparison standard value. In this case, the comparison standard value Cr can be calculated by means of a formula (1) wherein Tmin denotes the upper arm side minimum on-time, Td denotes dead time, fc denotes a carrier wave frequency and a carrier wave amplitude value is assumed to be 0 to α. The upper arm side minimum on-time in the above context means sampling and holding time in the A/D converter part.

$$Cr = (Tmin + Td) \times fc \times \alpha \tag{1}$$

As described above, in accordance with the current controller and the current offset correction method of the same according to the invention, the offset value of the current detection system is detected and the detected value of the current is offset-corrected. This allows the current controlling performance to be improved. Further, the offset value detection and correction are performed even when the motor is turned on, so that it is possible to correct not only a regular offset but also an irregular offset such as a temperature drift.

The invention may be applied even when the current detection by means of the shunt resistor 23 is carried out in three phases or any two phases only. Moreover, the shunt resistor 23 may be replaced with a DCCT to detect an electric current. The offset value may be an average value of any number of offset values.

The comparison standard value Cr in the formula (1) may be calculated in advance before a regular operation as long as the respective parameters Tmin, Td, fr and α are known in advance and the comparison standard value Cr is used in a state not changed to a regular operation.

INDUSTRIAL APPLICABILITY

The offset value can be constantly detected and corrected in a state that the motor is turned on, and therefore, the invention is effective not only for a regular offset but also an offset varying according to time while the current detection can be carried out with high accuracy. Accordingly, the invention can be also applied for a motor controlling device having a current controller in which the invention is carried out as well as a general industrial machine, a machine tool, a robot and such, which are motor-driven by means of the motor controlling device. The motor in the above context may be of a rotary type or a direct acting type.

The invention claimed is:

1. A current controller comprising:
a current control operating part for performing a current control operation on the basis of a current command to create a voltage command,
a modulated wave command creating part for creating a modulated wave command on the basis of the voltage command,
a carrier wave generating part for generating a carrier wave,
a PWM signal generating part for generating a PWM signal on the basis of comparison between the modulated wave command and the carrier wave,
an A/D converter part for A/D converting a current detection value of each phase on the basis of a voltage decrease of a shunt resistor connected in series to a lower arm element of each phase of a three-phase PWM inverter,
a carrier wave peak-trough judging part for receiving an input of the carrier wave to output a judging signal of a rise or a fall of the carrier wave, and
a current detection value operating part for receiving inputs of the modulated wave command and information of the peak-trough and an A/D converted value to output a current detection correction value.

2. The current controller according to claim 1, wherein the judging signal judges whether the carrier wave is in rising from the trough or in falling from the peak on the basis of:
a flag signal indicating whether or not a sampling value of the carrier wave for the present time has exceeded a maximum amplitude value or the minimum amplitude value of the carrier wave; and
a sampling value of the carrier wave in an optional section preceding to the sampling value of the carrier wave for the present time.

3. The current controller according to claim 1, wherein the current detection value operating part carries out an operation of a current detection correction value by subtraction of a current detection value and an offset value, the current detection value being an A/D converted value detected in falling from the peak of the carrier wave, the offset value being an A/D converted value detected in rising from the trough of the carrier wave.

4. The current controller according to claim 1, wherein the current detection value operating part carries out offset detection of the current detection value and an offset correction operation on the basis of comparison between the modulated wave command and a comparison standard value.

5. The current controller according to claim 1, wherein the current detection value operating part carries out offset detection only when the carrier wave is in rising from the trough thereof and the modulated wave command is larger than the comparison standard value.

6. The current controller according to claim 1, wherein the comparison standard value used in the current detection value operating part is calculated on the basis of sampling and holding time of the A/D converter part, a frequency of a carrier wave and dead time.

7. The current controller according to claim 1, wherein the A/D converted value is the current detection value of three or any two phases of the three-phase inverter.

8. A current offset correction method of a current controller including:
a current control operating part for performing a current control operation on the basis of a current command to create a voltage command,
a modulated wave command creating part for creating a modulated wave command on the basis of the voltage command,
a carrier wave generating part for generating a carrier wave,
a PWM signal generating part for generating a PWM signal on the basis of comparison between the modulated wave command and the carrier wave, and
an A/D converter part for A/D converting a current detection value of each phase on the basis of a voltage decrease of a shunt resistor connected in series to a lower arm element of each phase of a three-phase PWM inverter,
the current offset correction method comprising:
a peak-trough judging process for judging whether the carrier wave is in rising from the trough thereof or in falling from the peak thereof;
a comparing process for comparing the modulated wave command and a comparison standard value on the basis of a result in the judging process;
an offset detecting process for detecting an offset of the current detection value on the basis of a result in the comparing process; and
a correction value operating process for obtaining a difference between the current detection value and an offset value detected in the offset detecting process as a current detection correction value, wherein
a series of the processes are constantly carried out in a state of regular operation of a motor.

9. The current offset correction method of the current controller according to claim 8, wherein
the peak-trough judging process is carried out after completing a process of A/D converting the current detection value, and
in the peak-trough judging process, an A/D converted value is used as the current detection value when the carrier wave is in falling from the peak thereof, while the process goes to the comparing process when the carrier wave is in rising from the trough thereof, and
in the comparing process, the A/D converted value is used as the offset value when the modulated wave command is larger than the comparison standard value, while the process goes to the correction value operating process when the modulated value command is smaller than the comparison standard value.

* * * * *